United States Patent
Lee et al.

(10) Patent No.: US 8,194,663 B2
(45) Date of Patent: Jun. 5, 2012

(54) METHOD AND APPARATUS FOR OPERATING NETWORK APPLICATION IN COMMUNICATION DEVICES IN POWER SAVE MODE

(75) Inventors: Jae-shin Lee, Seoul (KR); Joo-yeol Lee, Seoul (KR); Dong-shin Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1364 days.

(21) Appl. No.: 11/481,853

(22) Filed: Jul. 7, 2006

(65) Prior Publication Data
US 2007/0066338 A1 Mar. 22, 2007

(30) Foreign Application Priority Data
Jul. 7, 2005 (KR) .......................... 10-2005-0061189

(51) Int. Cl.
*H04B 7/00* (2006.01)
(52) U.S. Cl. ........................................ 370/392; 455/522
(58) Field of Classification Search .................. 713/300, 713/310, 324, 330; 455/412, 414, 574, 69, 455/343.1; 370/332, 345, 329, 351; 709/220, 709/223; 714/734
See application file for complete search history.

(56) References Cited

U.S. PATENT DOCUMENTS

| | | | |
|---|---|---|---|
| 5,745,699 A | | 4/1998 | Lynn et al. |
| 5,983,353 A | * | 11/1999 | McHann, Jr. ................. 713/310 |
| 7,020,501 B1 | * | 3/2006 | Elliott et al. ................. 455/574 |
| 2002/0019215 A1 | * | 2/2002 | Romans .......................... 455/69 |
| 2002/0049049 A1 | * | 4/2002 | Sandahl et al. ............... 455/414 |
| 2002/0083143 A1 | | 6/2002 | Cheng |

(Continued)

FOREIGN PATENT DOCUMENTS
CN 1428034 A 2/2003
(Continued)

OTHER PUBLICATIONS

Sun-Mi Jun et al: "Controlling non IP bluetooth devices in UPnP home network", Advanced Communication Technology, 2004, The 6th International Conference on Phoenix Park, Korea, Feb. 9, 2004, vol. 2, Piscataway, NJ.

(Continued)

*Primary Examiner* — Dang Ton
*Assistant Examiner* — Mohamed Kamara
(74) *Attorney, Agent, or Firm* — Sughrue Mion, PLLC (57) ABSTRACT

An apparatus and method are provided for allowing UPnP devices to exchange power mode information with one another in a unified home network. The method of relaying a message in a unified network including at least first and second networks, the method includes receiving information regarding a power mode of a communication device connected to the first network from the communication device, generating a message indicating the power mode of the communication device based on the received information, and transmitting the message to the second network so that communication devices connected to the second network recognize the power mode of the communication device connected to the first network. Accordingly, even if a UPnP device in the power save mode cannot receive or transmit messages, another UPnP device can determine whether the UPnP device is connected to a network. If a new UPnP device generates an IP address according to an automatic IP mechanism, it is possible to prevent IP collision caused by a UPnP device that is connected to an IP network but operating in the power save mode.

8 Claims, 12 Drawing Sheets

U.S. PATENT DOCUMENTS

| | | |
|---|---|---|
| 2004/0120279 A1 | 6/2004 | Huckins |
| 2005/0002408 A1 | 1/2005 | Lee |
| 2006/0064619 A1* | 3/2006 | Wen et al. .................... 714/734 |
| 2006/0075269 A1* | 4/2006 | Liong et al. .................. 713/300 |
| 2006/0199621 A1* | 9/2006 | Stirbu et al. .................. 455/574 |
| 2007/0207765 A1* | 9/2007 | Nakahara et al. ......... 455/343.1 |

FOREIGN PATENT DOCUMENTS

| | | |
|---|---|---|
| EP | 1 469 654 A2 | 10/2004 |
| JP | 2001-308936 A | 11/2001 |
| JP | 2003-189378 A | 7/2003 |
| KR | 10-2004-0104775 A | 12/2004 |
| KR | 10-2005-0002192 A | 1/2005 |

OTHER PUBLICATIONS

Jakob Klarma, et al., "Design and Evaluation of Power Management Support for UPnP Devices", Jun. 10, 2005, Master Thesis, http://www.csee.usf.edu/christen/upnp/thesis/thesis.pdf.

\* cited by examiner

```
M_SEARCH*HTTP/1.1
HOST: 239.255.255.250:1900
MAN: "ssdp:discover"
MX: seconds to delay response
ST: search target
```

FIG. 1C (RELATED ART)

```
HTTP/1.1 200 OK
CACHE-CONTROL:max-age=seconds until advertisement expires
DATE: when response was generated
EXT:
LOCATION: URL for UPnP description for root device
SERVER: OS/version UPnP/1.0 product/version
ST: search target
USN: advertisement UUID
```

FIG. 1D (RELATED ART)

```
NOTIFY*HTTP/1.1
HOST: 239.255.255.250:1900
CACHE-CONTROL:max-age=seconds until advertisement expires
LOCATION: URL for UPnP description for root device
LOCATION: URL for UPnP description for root device
NT: search target
NTS: ssdp:alive
SERVER: OS/version UPnP/1.0 product/version
USN: advertisement UUID
```

METHOD AND APPARATUS FOR OPERATING NETWORK APPLICATION IN COMMUNICATION DEVICES IN POWER SAVE MODE

CROSS-REFERENCE TO RELATED PATENT APPLICATIONS

This application claims the priority from Korean Patent Application No. 10-2005-0061189, filed on Jul. 7, 2005, in the Korean Intellectual Property Office, the disclosure of which is incorporated herein in its entirety by reference.

BACKGROUND OF THE INVENTION

1. Field of the Invention

Methods and apparatuses consistent with the present invention relate to relaying messages to communication devices, and more particularly, to allowing Universal Plug and Play (UPnP) devices to exchange their exact status information with one other in a network.

2. Description of the Related Art

Universal Plug and Play (UPnP) is a technique of establishing communications among devices connected to a network, whereby services of a device can be automatically detected by another device. If a user just connects a device to a network, UPnP allows the connected device to be automatically detected and controlled by the existing devices in the network, thereby reducing efforts needed to install or set a device in the network. Therefore, UPnP has frequently been used as a technique of constructing a home network for home automation, and research has been continuously conducted into UPnP.

FIGS. 1A through 1D are diagrams illustrating a related art method in which information is exchanged between UPnP devices to recognize the presence of a UPnP device in a network.

Figure 1A:
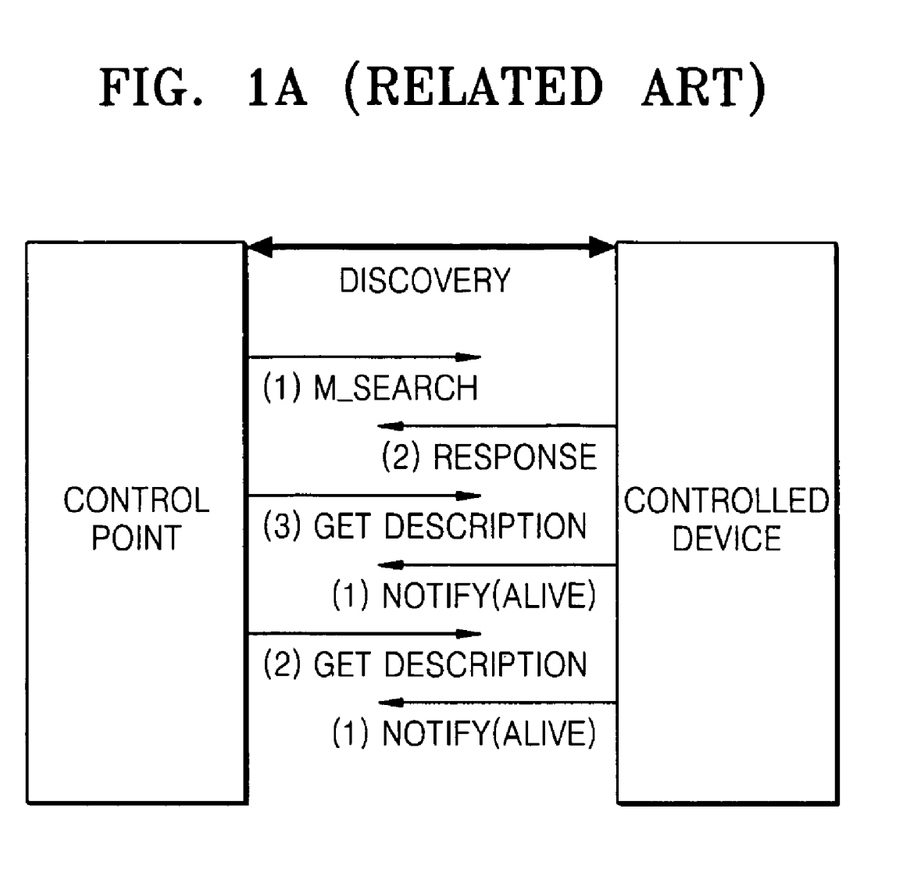
FIGS. 1A through 1D are diagrams illustrating a related art method of exchanging information between UPnP devices in a network to recognize the presence of a UPnP device.
Figure 1B:
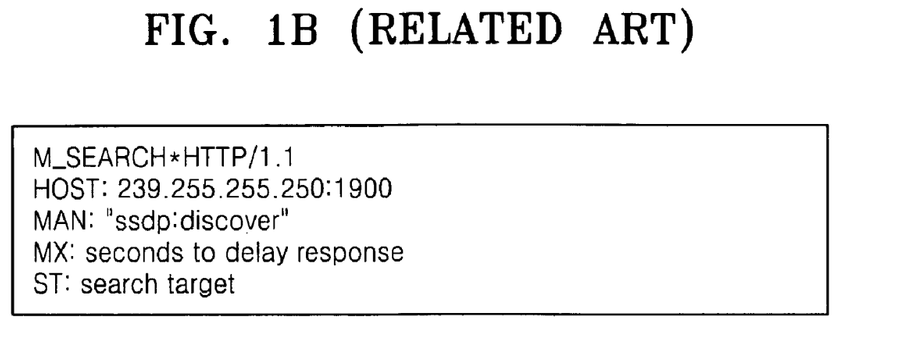
Figure 1C:
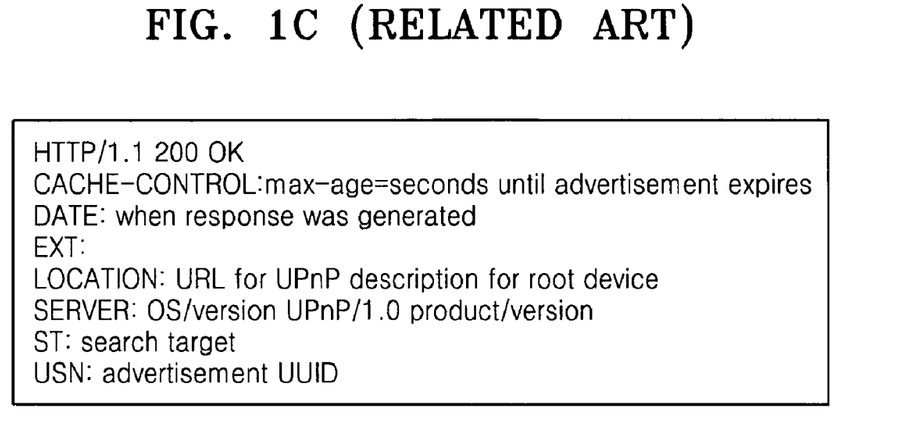
Figure 1D:
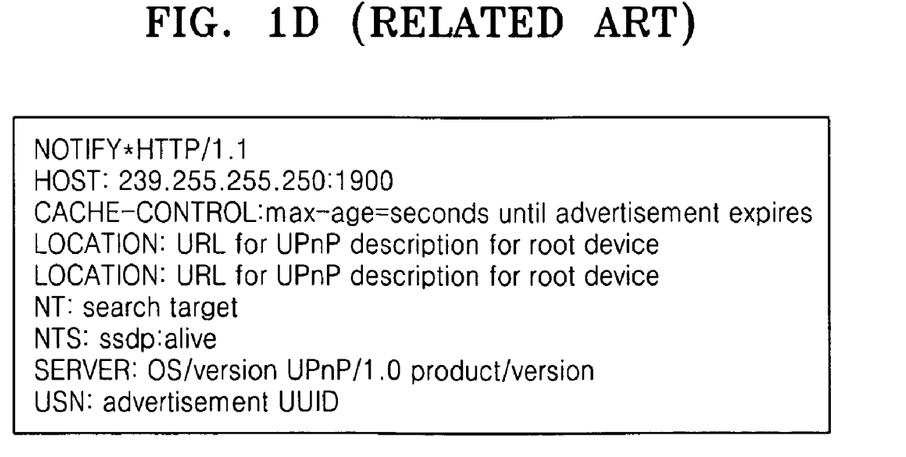

A UPnP communication protocol, which is used to establish communications between devices in a home network, is a standard whereby a message in a Simple Object Access Protocol (SOAP) format is interpreted to interpret the attributes of and control information for a device, based on an Internet Protocol (IP) packet. Discovery and description operations are performed to detect a device in a network by using the UPnP communication protocol. Referring to FIG. 1A, in order to perform the discovery and description operations, messages, such as an M-SEARCH message, a RESPONSE message regarding the M-SEARCH message, and a NOTIFY message, are exchanged between a UPnP device that provides services and a control point that is a client requesting the services. Through the three messages, UPnP devices in a network are perceived by the control point. Details of the three messages are disclosed in UPnP standards.

Figure 2:
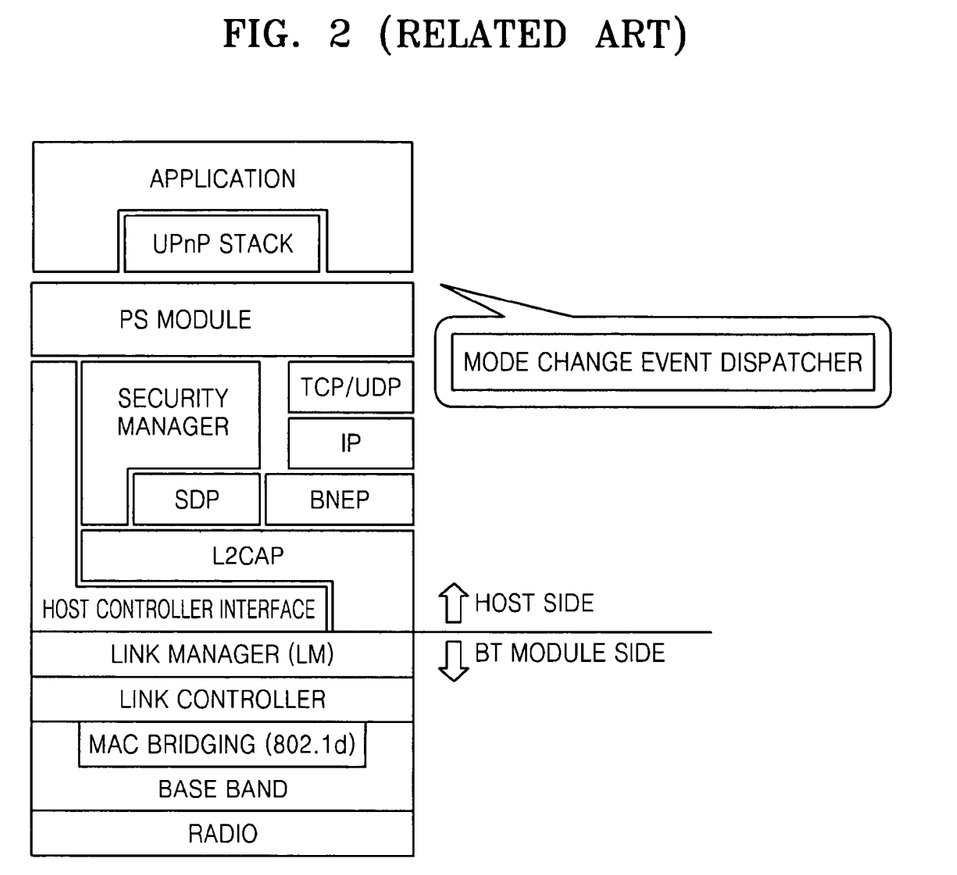
FIG. 2 is a diagram of a protocol stack used to make a mobile communication device that supports Bluetooth operate as a UPnP device.

FIG. 2 is a diagram of a protocol stack used to make a mobile communication device that supports Bluetooth operate as a UPnP device.

A Bluetooth device allows a power mode to be changed at an application layer through a Host Controller Interface (HCI). That is, when a UPnP device or a control point operates in a power save mode, the power mode can be changed through the HCI. A Media Access Control (MAC) Bridging 802.11 d layer provides a function of connecting different network interfaces to each other. For instance, a packet received via a Bluetooth network interface is transmitted to an Ethernet network interface via the MAC Bridging 802.11d layer. Bluetooth core stack and Personal Area Network (PAN) profile support a process of transforming a received Bluetooth packet into an IP packet, and a PS module manages the power mode of a device. A UPnP stack and the application layer act as a network middleware, i.e., they perceive and control devices connected to a network and inform the other devices of the functions of the connected devices. The UPnP stack includes internal modules that set the IP of a device, transmit the information regarding the device via the network, and report a status change of the device.

Figure 3:
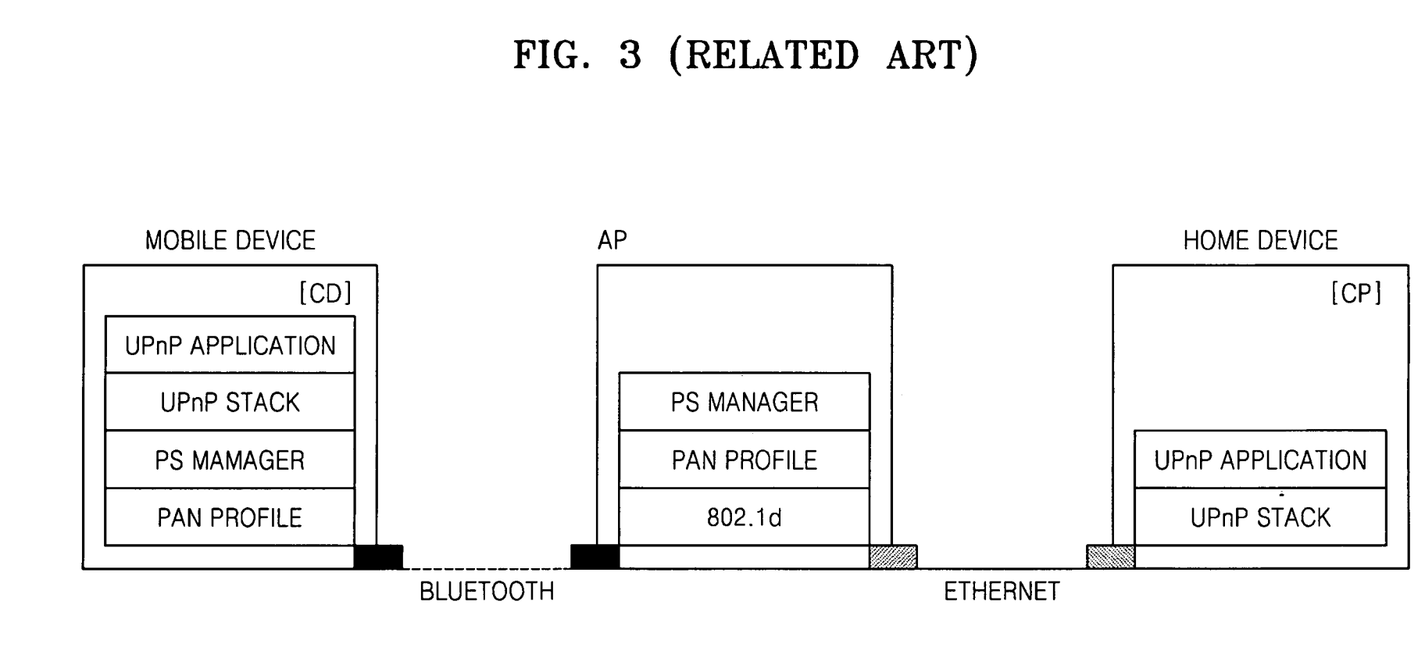
FIG. 3 is a schematic diagram of a home network system in which a mobile communication device and a wired communication device operate together.

When constructing a home network using a UPnP protocol, a device relaying messages to two devices is needed to operate a device connected to a wired network together with a device connected to a wireless network. For example, a home network system in which a wired network device operates as a control point and a Bluetooth device operates as a UPnP controlled device that provides services, may be constructed as illustrated in FIG. 3.

A Bluetooth system uses a piconet as a basis network unit. In the Bluetooth system, the network is managed by a master, and slaves exchange data with one another through the master. Since it takes several seconds to establish a data link between two Bluetooth devices, it is recommended that a set data link be not lost. If a Bluetooth device remains connected to the network even when there is no data transmission, unnecessary power consumption results. As a solution to this problem, the Bluetooth device supports three power save modes.

Figure 4A:
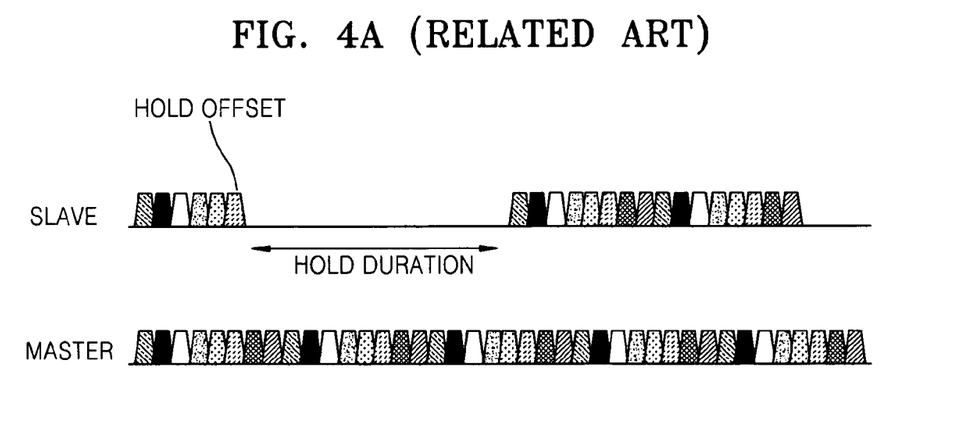
FIGS. 4A through 4C illustrate operations of a Bluetooth device in various power save modes.
Figure 4B:
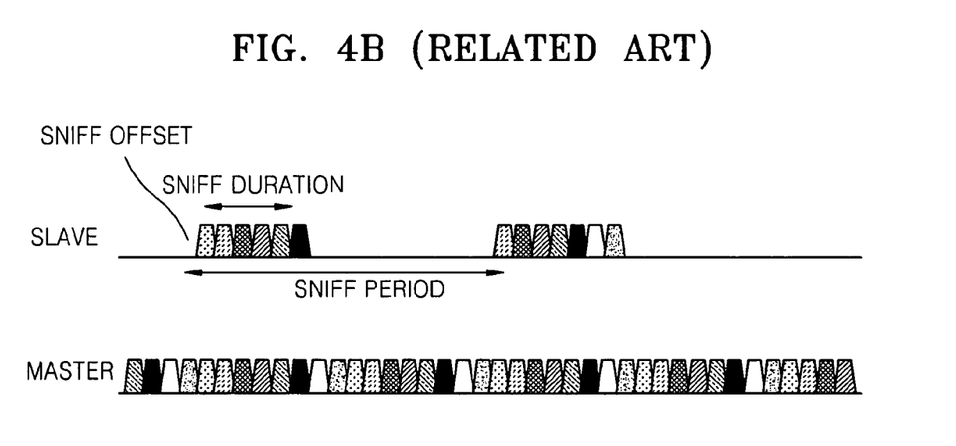
Figure 4C:
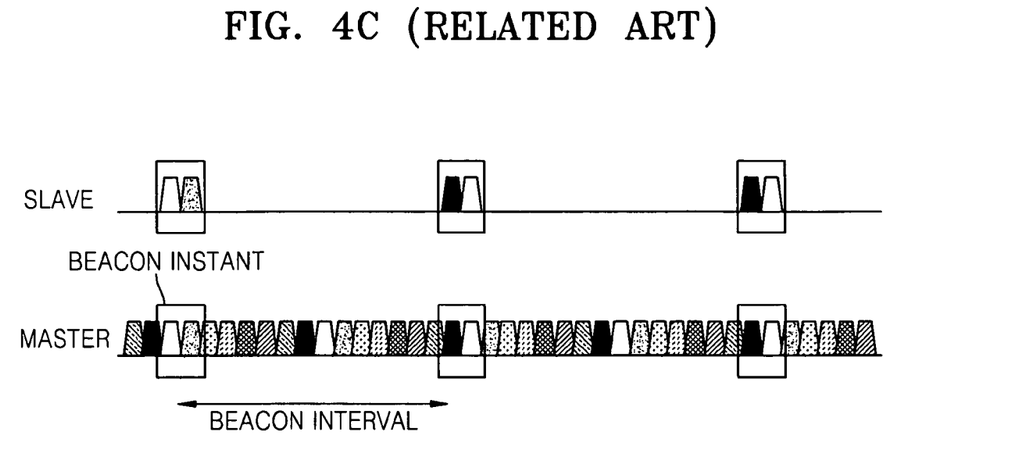

FIGS. 4A through 4C illustrate an exchange of data between a master and a slave when a Bluetooth device enters a power save mode. In detail, FIG. 4A is a diagram illustrating an exchange of data between a slave and a master in a hold mode. The hold mode indicates a type of the power save mode in an deactivation period that is not periodic but is predictable. In the hold duration, an Asynchronous Connection-Less (ACL) packet is not exchanged between the two devices, and the deactivation mode is changed to an activation mode when the hold duration ends.

FIG. 4B is a diagram illustrating a sniff mode that is an action mode in which exchange of packets is allowed in a specific slot of a cycle. In the sniff mode, transmission characteristics are determined by exchanging information regarding a sniff offset that is a point of time when packets are exchanged, a sniff duration defined by information regarding a first packet and a last packet, and a sniff period that is a duty cycle of the sniff mode between a master and a slave.

FIG. 4C is a diagram illustrating a park mode that minimizes power consumption of a slave. Each of a master and a slave can transmit a message requesting a change from an action mode to the hold mode to the opposite side. When the slave operates in the hold mode, the slave returns an address AM ADDR of a Bluetooth device that is in an activation state to the master.

Specific packets are exchanged at predetermined intervals of time in order that each UPnP device in a home network can recognize the presence of the other UPnP devices in the home network and receive and maintain information from the other UPnP devices. However, as described above, when a Bluetooth device operates in the power save mode to reduce power consumption, packets that must be periodically delivered are unable to be delivered, thereby preventing accurate information regarding devices in the home network from being obtained. Also, when a UPnP control command is delivered to a device in the power save mode, a response to this command will not probably be received from the device, thereby causing an error.

Also, in an addressing operation of a UPnP device, IP collision may occur when a DHCP server is not supported and each device is allocated an IP address through an automatic IP mechanism. A new device connected to the home network generates an IP address through the automatic IP mechanism and broadcasts a message for checking whether a device is allocated the generated IP address. If a device allocated the generated IP address enters the power save mode, it cannot receive the message from the new device and transmit a response message to the new device. In this case, the new device registers and uses the generated IP address. If the device in the power save mode enters the activation mode, the same IP address may be used by both the device and the new device.

SUMMARY OF THE INVENTION

The present invention provides an apparatus and method for reporting the power-mode state of a communication device operating in a power save mode to other devices, and delivering a message in response to requests from the other devices on behalf of the communication device operating in the power save mode.

According to an aspect of the present invention, there is provided a method of relaying a message in a unified network comprised of at least first and second networks, the method including receiving information regarding a power mode of a communication device connected to the first network from the communication device; generating a message indicating the power mode of the communication device based on the received information; and transmitting the message to the second network so that communication devices connected to the second network recognize the power mode of the communication device connected to the first network.

According to another aspect of the present invention, there is provided a method of relaying messages in a unified network comprised of at least first and second networks, the method including receiving, from a communication device connected to the first network, a message inquiring whether a predetermined network address is in use, comparing the predetermined network address with an network address of each of a plurality of communication devices connected to the second network; when the comparison result shows that the predetermined network address is the same as one of the network addresses of the communication devices connected to the second network, determining a power mode of the communication device that is connected to the first network and allocating the predetermined network address; and selectively transmitting a response message in response to the inquiry based on the determination result.

According to another aspect of the present invention, there is provided a computer readable medium having recorded thereon a computer program for executing the method of relaying messages in a unified network According to another aspect of the present invention, there is provided an apparatus for relaying messages in a unified network comprised of at least first and second networks, the apparatus including a storage unit storing information regarding an network address and a power mode of each of a plurality of communication devices connected to the first network; a comparator receiving a message inquiring whether a predetermined network address is in use from communication devices connected to the second network, and comparing the predetermined network address with the network addresses in the storage unit; a determination unit determining a power mode of a communication device corresponding to the predetermined network address when the comparison result shows that the predetermined network address is the same as one of the network addresses in the storage unit; a response message generator selectively generating a response message in response to the inquiry based on the determination result; and a response message transmitter transmitting the generated response message to the second network.

When the determination result shows that the communication device corresponding to the predetermined network address is in a power save mode, the response message generator generates a response message indicating that the predetermined network address is in use.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS

Figure 5:
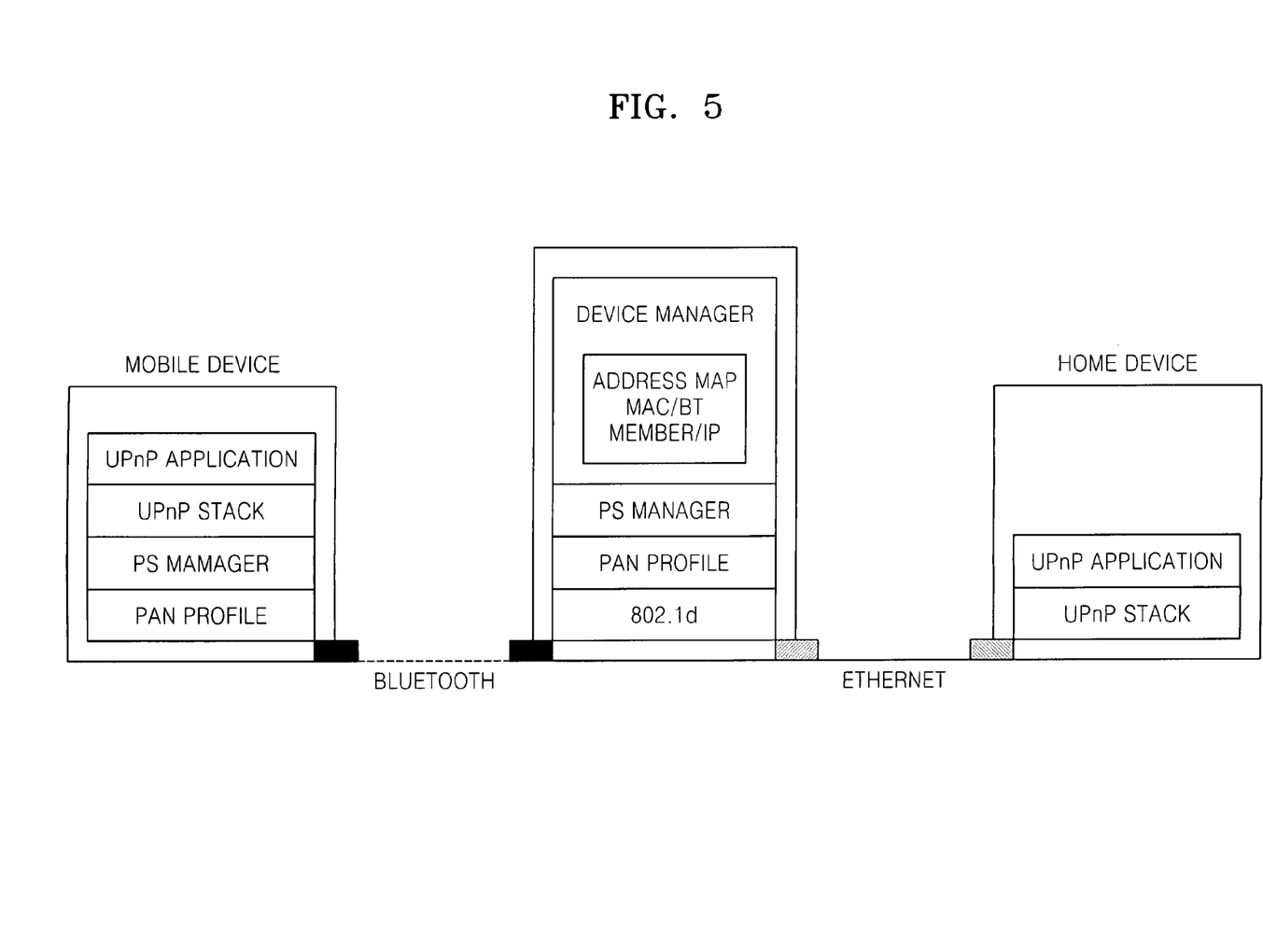
FIG. 5 is a schematic diagram of a home network system according to an exemplary embodiment of the present invention.

FIG. 5 is a schematic diagram of a home network system according to an exemplary embodiment of the present invention. In this disclosure, it is assumed that a UPnP device that provides services is a Bluetooth device, a control point is a device connected to a wired network and connected to a repeater via an Ethernet network, and a home network includes the Bluetooth device, the control point, and the repeater.

Referring to FIG. 5, an address map is stored in a repeater unlike in the home network system of FIG. 3. In the address map, the MAC address, the IP address, and power mode information of a Bluetooth device are mapped and stored. When receiving an Address Resolution Protocol (ARP) message that is to be finally delivered to an Bluetooth device, the repeater determines whether the Bluetooth device enters a power save mode based on the address map, and processes the ARP message according to the determination result. A detailed description of how the repeater operates will be described later in greater detail.

Figure 6:
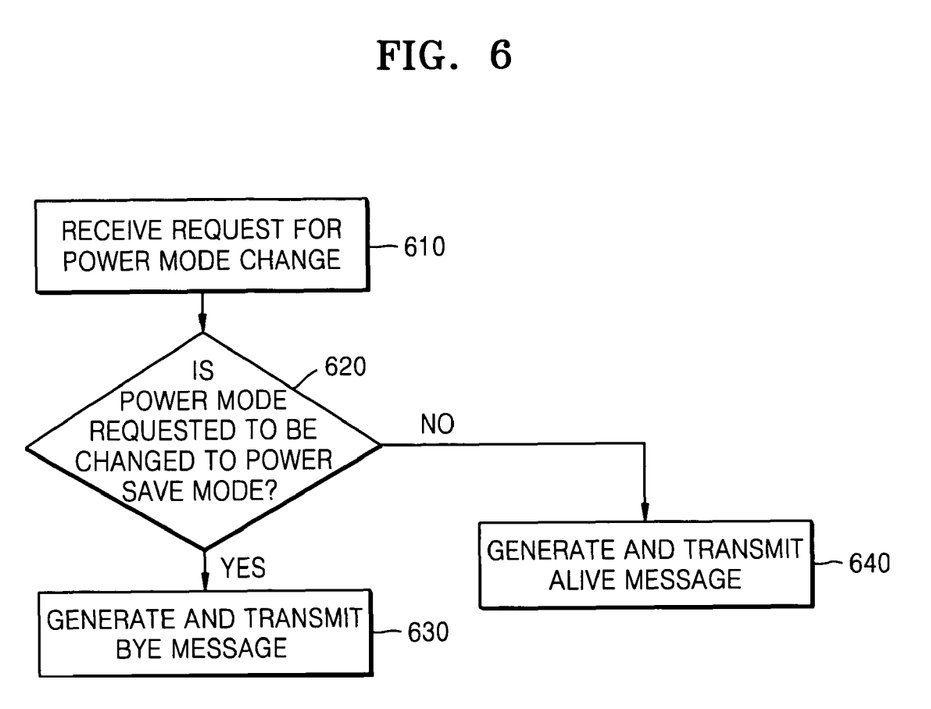
FIG. 6 is a flowchart illustrating a method in which a repeater reports a change of the power mode of a Bluetooth device via a wired network, according to an exemplary embodiment of the present invention.

FIG. 6 is a flowchart illustrating a method in which a repeater reports a change of the power mode of a Bluetooth device via a wired network, according to an exemplary embodiment of the present invention. When a message requesting a change of the power mode of the Bluetooth device is received from the Bluetooth device (610), the repeater analyzes the received message to determine whether the Bluetooth device requests a power mode change from an active mode to a power save mode or from the power save mode to the active mode (620). If it is determined that the Bluetooth device requests a power mode change from the active mode to the power save mode, the repeater generates a BYE message indicating that the Bluetooth device is entering into the power save mode, and broadcasts it to all of UPnP devices in the wired network (630). If it is determined that the Bluetooth device requests a power mode change from the power save mode to the active mode, the repeater generates an ALIVE message indicating that the Bluetooth device enters the active mode and broadcasts it to all of the UPnP devices in the wired network (640). Accordingly, all of the UPnP devices in the wired network can recognize whether the Bluetooth device is operating in power save mode or in an active mode.

Figure 7:
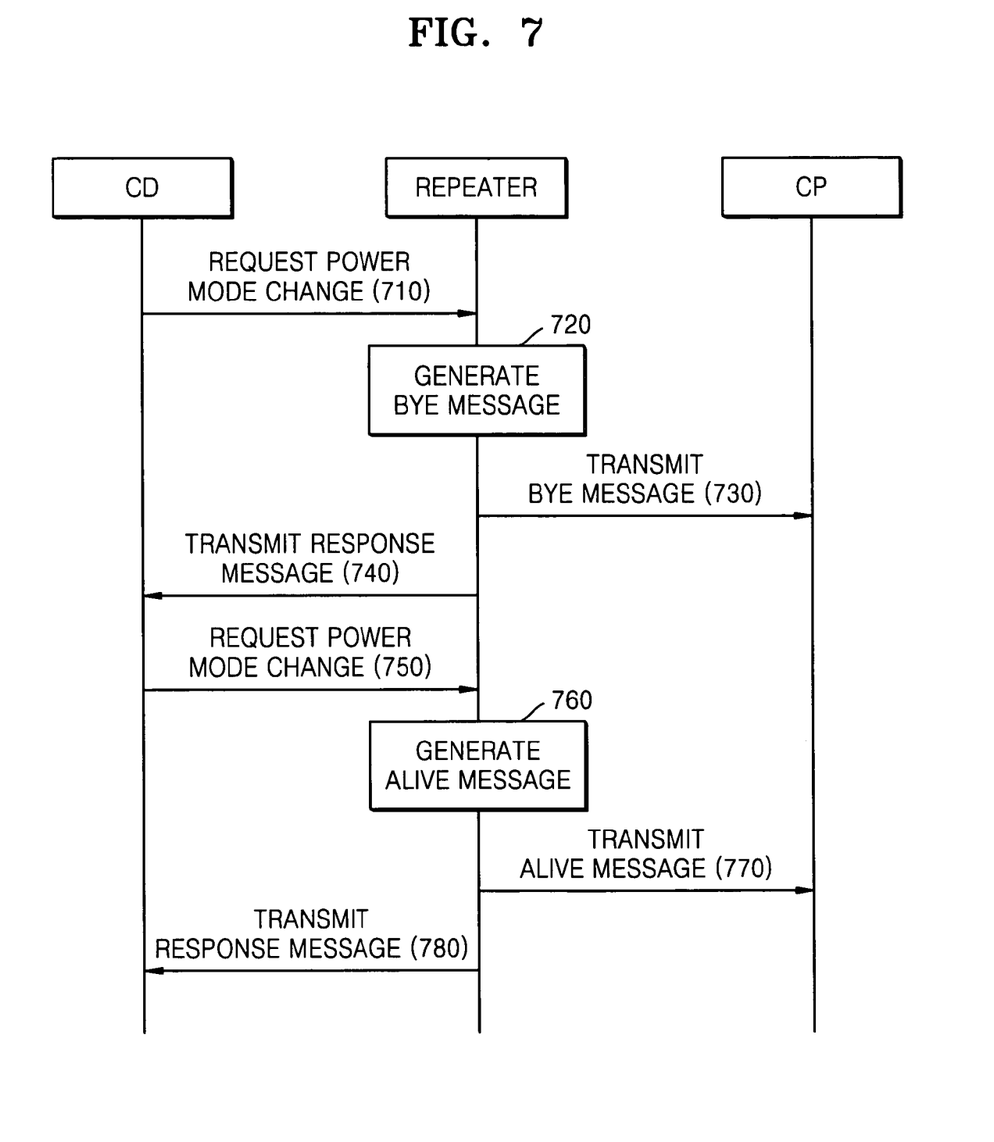
FIG. 7 is a flowchart illustrating a method of transmitting information regarding a changed power mode of a Bluetooth device via a wired network, according to an exemplary embodiment of the present invention.

FIG. 7 is a flowchart illustrating a method of delivering information regarding a changed power mode of a Bluetooth device via a wired network, according to an exemplary embodiment of the present invention. In detail, FIG. 7 illustrates the flow of messages when the mode of a UPnP device, which is a Bluetooth device operating in the active mode, is changed to the power save mode and then to the active mode.

Referring to FIG. 7, a repeater according to the current exemplary embodiment of the present invention receives a message from a UPnP device (controlled device CD) requesting a power mode change of the UPnP device operating in the active mode to the power save mode (710), and generates a BYE message indicating that the power save mode of the UPnP device is changed to the power save mode (720). Next, the repeater transmits the generated BYE message to a control point (CP) connected to a wired network so as to report the power mode change to the wired network (730), and transmits a response message to the UPnP device (740). Here, an address map stored in the repeater includes information regarding the power mode change. For convenience of explanation, FIG. 7 illustrates transmission of the BYE message to one control point, but the BYE message may be transmitted to all of a plurality of UPnP devices in the wired network.

Next, when the UPnP device in the power save mode device transmits a message indicating a request for a power mode change to the active mode to the repeater (750), the repeater generates an ALIVE message containing the request (760), transmits it to the control point in the wired network (770), and transmits a response message to the UPnP device (780). Likewise, the address map stored in the repeater includes information regarding the changed power mode.

Figure 8:
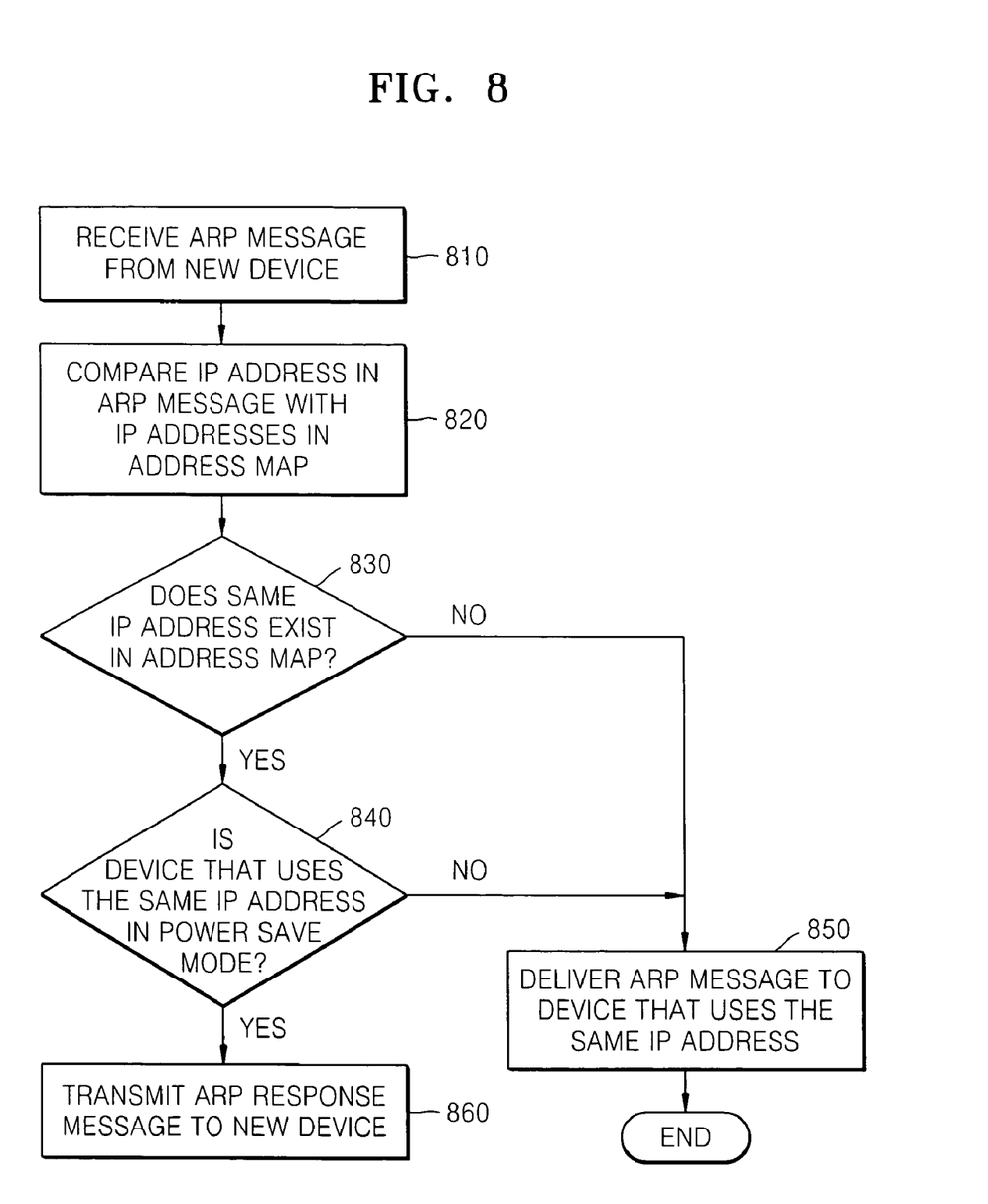
FIG. 8 is a flowchart illustrating a method in which a repeater processes a received Address Resolution Protocol (ARP) message, according to an exemplary embodiment of the present invention.

FIG. 8 is a flowchart illustrating a method in which a repeater processes an ARP message, according to an exemplary embodiment of the present invention. A new UPnP device connected to a home network is allocated an Internet protocol (IP) address from a DHCP server but generates an IP address by itself according to an automatic IP mechanism when the DHCP server is not supported as described above. Before registration of the generated IP address, the new UPnP device broadcasts an ARP message to determine whether the generated IP address has already been used.

When the ARP message is received from the new UPnP device (810), the repeater compares the IP address specified in the received ARP message with IP addresses recorded in an address map stored in the repeater (820, 830). If the IP address specified in the ARP message is not the same as any of the IP addresses in the address map, the repeater delivers the ARP message via a wireless network (850). If the IP address in the ARP message is the same as one of the IP addresses in the address map, it is determined whether a device that also uses the same IP address enters the power save mode (840). If the device that also uses the same IP address is in the power save mode, the device cannot respond to the ARP message, and thus, the repeater generates an ARP response message indicating that the same IP address is in use, and transmits it to the new UPnP device on behalf of the device (860). If the device that also uses the same IP address is not in the power save mode, the ARP message is delivered to the device via the wireless network connected to the repeater.

Figure 9:
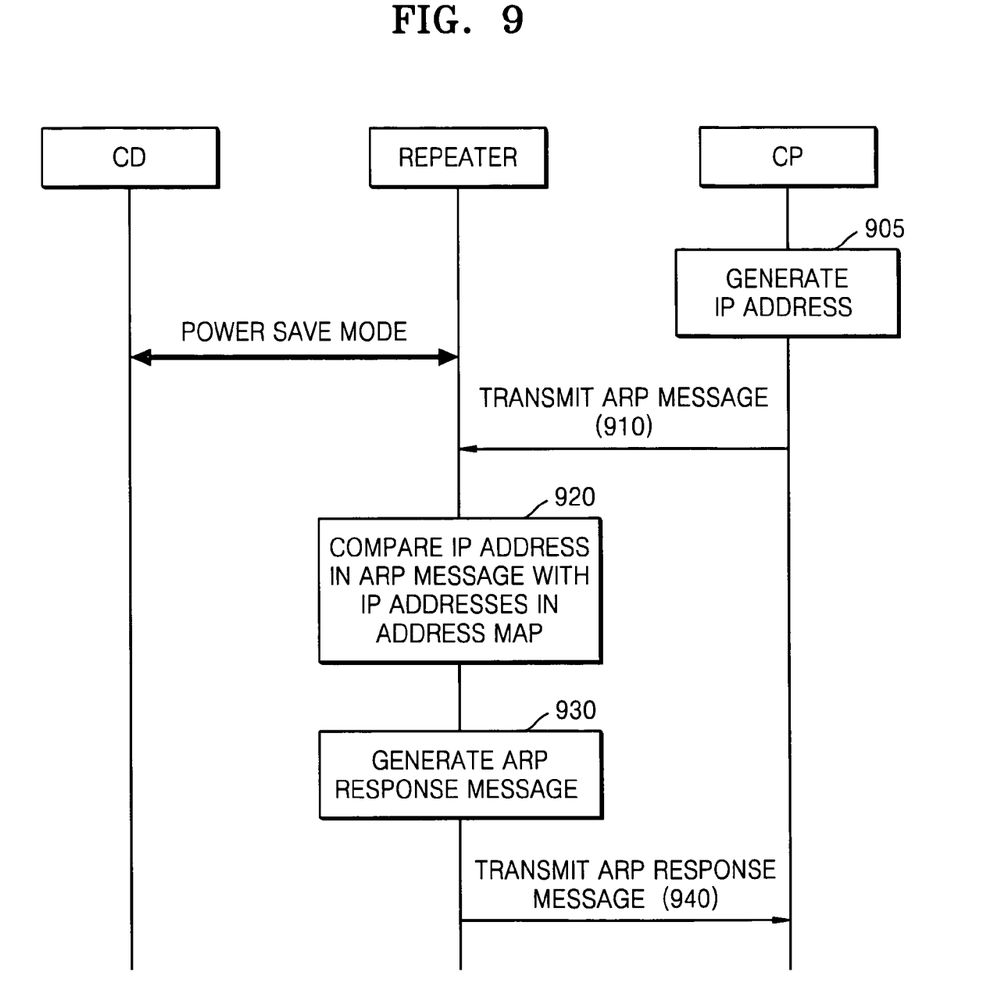
FIG. 9 is a flowchart illustrating a method in which a repeater transmits an ARP response message on behalf of a Bluetooth device that enters a power save mode, according to an exemplary embodiment of the present invention.

FIG. 9 is a flowchart illustrating a method in which a repeater delivers an ARP response message on behalf of a Bluetooth device in the power save mode, according to an exemplary embodiment of the present invention. It is assumed that a control point being newly connected to a home network generates the same IP address as the IP address of a UPnP device that is a Bluetooth device in the power save mode, and transmits an ARP message to the repeater.

The newly connected control point generates an IP address (905), and transmits an ARP message indicating the generated IP address to the repeater (910). Upon receiving the ARP message, the repeater compares the IP address in the ARP message with IP addresses in its address map and recognizes that the IP address has already been allocated to the UPnP device in the power save mode (920). Next, the repeater generates an ARP response message on behalf of the UPnP device (930), and transmits it to the control point that transmits the ARP message so as to report that the IP address is in use (940).

Figure 10:
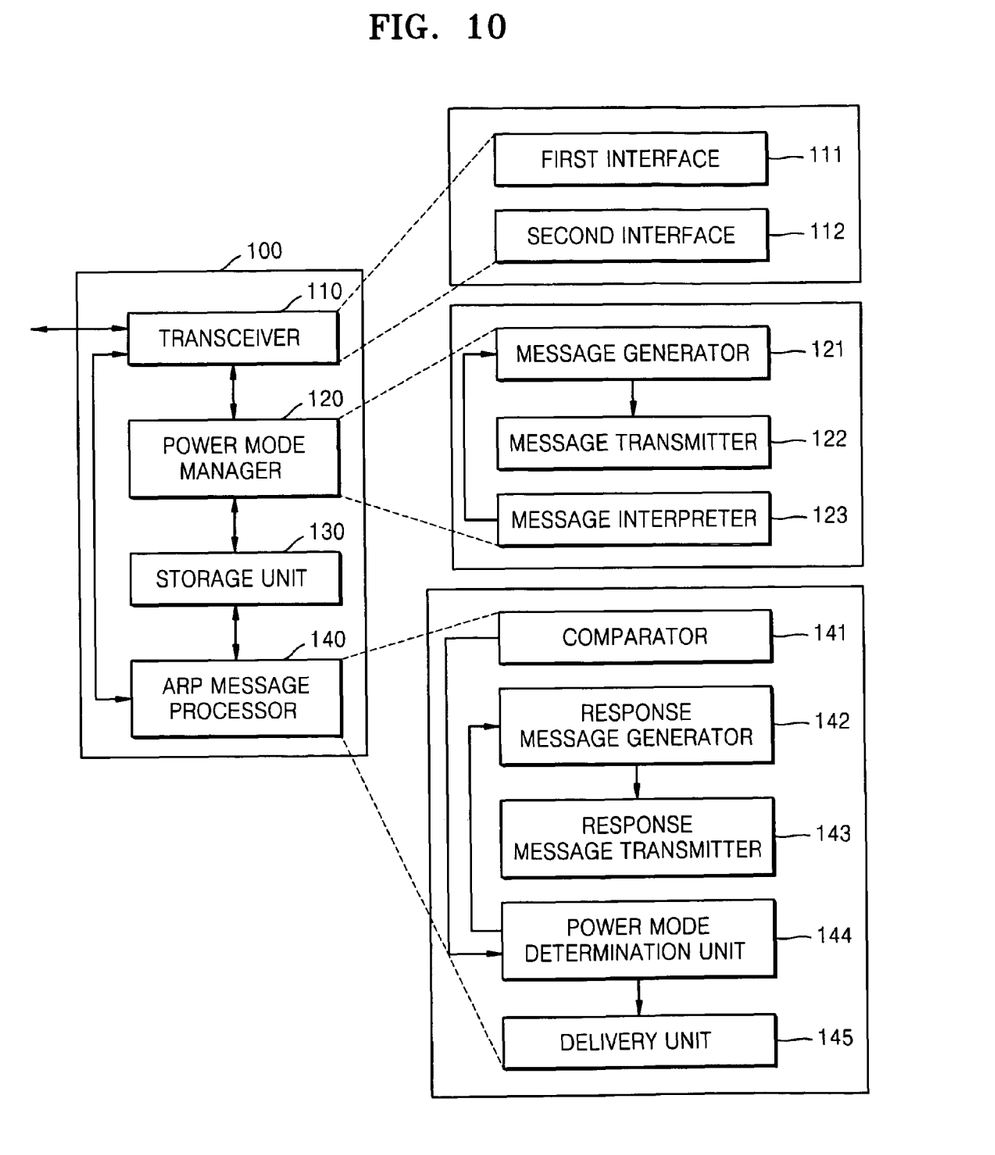
FIG. 10 is a block diagram of a repeater according to an exemplary embodiment of the present invention.

FIG. 10 is a block diagram of a repeater 100 according to an exemplary embodiment of the present invention. Referring to FIG. 10, the repeater 100 includes a transceiver 110, a power mode manager 120, a storage unit 130, and an ARP message processor 140. The transceiver 110 includes first and second communication interfaces 111 and 112. The power mode manager 120 includes a message generator 121, a message transmitter 122, and a message interpreter 123. The ARP message processor 140 includes a comparator 141, a response message generator 142, a response message transmitter 143, a power mode determination unit 144, and a delivery unit 145.

The transceiver 110 allows the repeater 100 to communicate via two or more different networks, e.g., a wired network and a wireless network. In a current exemplary embodiment of the present invention, since the transceiver 110 communicates via the Bluetooth and the Ethernet, it includes the first and second communication interfaces 111 and 112.

The power mode manager 120 manages the power mode of a UPnP device. When the power mode manger 120 receives a message requesting a change of the power mode of the UPnP device from the UPnP device, the message interpreter 123 interprets the message, the message generator 121 generates a message indicating the changed power mode based on the interpretation result, and the message transmitter 122 transmits the generated message to the wired network via the transceiver 110.

The storage unit 130 stores an address map in which the IP addresses, the MAC addresses, and the power modes of UPnP devices are mapped. When the message requesting the power mode change is received from the UPnP device via the transceiver 110, the information regarding the power mode is updated.

The ARP message processor 140 processes an ARP message from a UPnP device being newly connected to a home network. In the ARP message processor 140, the comparator 141 compares an IP address specified in the received ARP message with IP addresses included in the address map in the storage unit 130. If the IP address specified in the ARP message is the same as one of the IP addresses in the address map, the power mode determination unit 144 determines whether a UPnP device allocated with the same IP address is in the power mode. When the power mode determination unit 144 determines that the UPnP device allocated the same IP address operates in the power save mode, the response message generator 142 generates an ARP response message on behalf of the UPnP device allocated with the same IP address. The response message transmitter 143 transmits the generated ARP response message to the UPnP device that transmits the ARP message. If the comparison result from the comparator 141 reveals that the IP address specified in the ARP message is not the same as any of the IP addresses in the address map or that the power mode determination unit 144 determines that the UPnP device allocated the same IP address is not in the power save mode although the IP address in the ARP message is the same as one of the IP addresses in the address map, the delivery unit 145 transmits the ARP message to the wireless network so that the UPnP device in the active mode can respond to the ARP message.

The above exemplary embodiments of the present invention can be embodied as a computer program, and executed in a general digital computer via a computer readable medium. The computer readable medium includes a magnetic storage medium (a ROM, a floppy disk, a hard disc, etc.) and an optical data storage device (a CD-ROM, a DVD, etc.), for example.

As described above, according to the present invention, it is possible to exactly manage status information of all of a plurality of UPnP devices in a unified network consisting of different low-grade networks. Even if a UPnP device in the power save mode cannot receive or transmit messages, another UPnP device can determine whether the UPnP device is connected to a network. If a new UPnP device generates an IP address according to an automatic IP mechanism, it is possible to prevent IP collision caused by a UPnP device that is connected to an IP network but operating in the power save mode.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of relaying messages in a unified network comprising at least first and second networks, the method comprising:

receiving, from a communication device connected to the first network, a message inquiring whether a predetermined network address is in use;

comparing the predetermined network address with a network address of each of a plurality of communication devices connected to the second network;

if a result of the comparing shows that the predetermined network address is the same as one of the network addresses of the communication devices connected to the second network, determining a power mode of the communication device that is connected to the second network; and selectively transmitting a response message in response to the inquiry based on a result of the determining.

2. The method of claim 1, wherein the selectively transmitting the response message comprises transmitting the response message indicating that the predetermined network address is in use to the communication device connected to the first network if the result of the determining indicates that the communication device corresponding to the predetermined network address is in a power save mode.

3. The method of claim 1, wherein the selectively transmitting the response message comprises transmitting the message to the communication device corresponding to the predetermined network address if the result of the determining indicates that the communication device corresponding to the predetermined network address is not in a power save mode.

4. The method of claim 1, wherein the unified network is based on Universal Plug and Play (UPnP).

5. An apparatus for relaying messages in a unified network comprising at least first and second networks, the apparatus comprising:

a storage unit which stores information regarding a network address and a power mode of each of a plurality of communication devices connected to the first network;

a comparator which receives a message inquiring whether a predetermined network address is in use from communication devices connected to the second network, and compares the predetermined network address with the network addresses stored in the storage unit;

a determination unit which determines a power mode of a communication device corresponding to the predetermined network address if a comparison result received from the comparator indicates that the predetermined network address is the same as one of the network addresses stored in the storage unit;

a response message generator which selectively generates a response message in response to the inquiry based on a determination result received from the determination unit; and a response message transmitter which transmits the response message to the second network.

6. The apparatus of claim 5, wherein, if the determination result indicates that the communication device corresponding to the predetermined network address is in a power save mode, the response message generator generates a response message indicating that the predetermined network address is in use.

7. The apparatus of claim 5, further comprising a delivery unit which delivers the message to the first network, if the comparison result indicates that the predetermined network address is not the same as any of the network addresses stored in the storage unit or the determination result indicates that the communication device corresponding to the predetermined network address is not in a power save mode.

8. The method of claim 1, wherein the first network is different from the second network.

* * * * *